US008855863B2

(12) United States Patent
Doi et al.

(10) Patent No.: US 8,855,863 B2
(45) Date of Patent: Oct. 7, 2014

(54) VEHICLE STEERING APPARATUS

(75) Inventors: Takashi Doi, Susono (JP); Chikara Okazaki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/808,773

(22) PCT Filed: Jun. 21, 2011

(86) PCT No.: PCT/JP2011/064131
§ 371 (c)(1),
(2), (4) Date: Jan. 7, 2013

(87) PCT Pub. No.: WO2012/005107
PCT Pub. Date: Jan. 12, 2012

(65) Prior Publication Data
US 2013/0110352 A1 May 2, 2013

(30) Foreign Application Priority Data

Jul. 9, 2010  (JP) .................................. 2010-156948

(51) Int. Cl.
*B62D 6/10* (2006.01)
*B62D 1/16* (2006.01)
*B62D 6/00* (2006.01)
*B62D 6/02* (2006.01)

(52) U.S. Cl.
CPC *B62D 1/16* (2013.01); *B62D 6/008* (2013.01); *B62D 6/02* (2013.01)
USPC .......................................................... 701/42

(58) Field of Classification Search
CPC ...... B62D 7/159; B62D 5/0463; B62D 6/003; B62D 6/002; B62D 5/008
USPC ............................................................ 701/42
See application file for complete search history.

(56) References Cited

U.S. PATENT DOCUMENTS

| 5,198,981 A | 3/1993 | Collier-Hallman et al. |
| 5,528,497 A | 6/1996 | Yamamoto et al. |
| 6,148,951 A | 11/2000 | Nishi et al. |
| 2006/0006021 A1* | 1/2006 | Takimoto et al. ............. 180/446 |

FOREIGN PATENT DOCUMENTS

| JP | 5 105100 | 4/1993 |
| JP | 6 56046 | 3/1994 |
| JP | 11 147482 | 6/1999 |

(Continued)

OTHER PUBLICATIONS

International Search Report Issued Sep. 27, 2011 in PCT/JP11/064131 Filed Jun. 21, 2011.

*Primary Examiner* — James Trammell
*Assistant Examiner* — Michael D Lang
(74) *Attorney, Agent, or Firm* — Oblon, Spivak, McClelland, Maier & Neustadt, L.L.P.

(57) ABSTRACT

A vehicle steering apparatus is an apparatus, mounted on a vehicle, for setting a target steering reaction force to be applied to a steering wheel on the basis of a steering angle and a vehicle speed and for performing reaction force control to apply the target steering reaction force, the vehicle steering apparatus provided with: a setting device for setting the target steering reaction force such that the target steering reaction force is less than a predetermined base steering reaction force if the vehicle speed is less than or equal to a predetermined base vehicle speed.

5 Claims, 3 Drawing Sheets

(56) References Cited

FOREIGN PATENT DOCUMENTS

| | | |
|---|---|---|
| JP | 2003 2224 | 1/2003 |
| JP | 2006 27301 | 2/2006 |
| JP | 2006 137215 | 6/2006 |
| JP | 2006 231957 | 9/2006 |
| JP | 2007 326460 | 12/2007 |
| JP | 2008 155723 | 7/2008 |
| WO | 2012 002179 | 1/2012 |

* cited by examiner

VEHICLE STEERING APPARATUS

TECHNICAL FIELD

The present invention relates to a vehicle steering apparatus.

BACKGROUND ART

As this type of vehicle steering apparatus, there is known an electric power steering (EPS) for setting a target steering reaction force (or "target steering torque") to be applied to a steering wheel on the basis of a steering angle and a vehicle speed and for performing reaction force control to apply the target steering reaction force to the steering wheel (e.g. refer to Patent document 1). By performing such reaction force control, the steering feeling of a driver can be improved. Moreover, as prior art documents related to the present invention, there are Patent documents 2 and 3.

PRIOR ART DOCUMENT

Patent Document

Patent document 1: U.S. Pat. No. 5,198,981, Specification
Patent document 2: Japanese Patent Application Laid Open No. Hei 06-056046
Patent document 3: Japanese Patent Application Laid Open No. 2006-137215

DISCLOSURE OF INVENTION

Subject to be Solved by the Invention

In the technology disclosed in Patent document 1 described above, however, for example, the target steering reaction force is set in accordance with the steering angle even when a vehicle stops, and this likely makes the driver feel an unnecessary steering reaction force when the vehicle stops. Thus, it is likely hard to improve the steering feeling of the driver, which is technically problematic.

In view of the aforementioned problem, it is therefore an object of the present invention to provide a vehicle steering apparatus capable of improving the steering feeling of the driver, for example, when the vehicle stops.

Means for Solving the Subject

In order to solve the above-mentioned object, first vehicle steering apparatus of the present invention which is mounted on a vehicle, and which sets a target steering reaction force to be applied to a steering wheel on the basis of a steering angle and a vehicle speed, and performs reaction force control to apply the target steering reaction force. The first vehicle steering apparatus is provided with a setting device for setting the target steering reaction force such that the target steering reaction force is less than a predetermined base steering reaction force if the vehicle speed is less than or equal to a predetermined reference vehicle speed.

According to the first vehicle steering apparatus of the present invention, the target steering reaction force (i.e. a target value of a steering reaction force to be applied to the steering wheel) is set on the basis of the steering angle and the vehicle speed, and the target steering reaction force is applied to the steering wheel by the reaction force control.

In the present invention, in particular, the setting device sets the target steering reaction force such that the target steering reaction force is less than the base steering reaction force if the vehicle speed is less than or equal to the reference vehicle speed. Thus, when the vehicle speed is less than or equal to the reference vehicle speed, such as, for example, when the vehicle stops, it is possible to inhibit or prevent a driver from feeling an unnecessary steering reaction force and to improve the steering feeling of the driver.

In one aspect of the first vehicle steering apparatus of the present invention, said setting device sets the target steering reaction force on the basis of steering torque applied to a steering shaft via the steering wheel if the vehicle speed is less than or equal to the reference vehicle speed.

According to this aspect, the setting device sets the target steering reaction force on the basis of the steering torque so as to balance torque caused by the target steering reaction force with the steering torque if the vehicle speed is less than or equal to the reference vehicle speed. At this time, the setting device sets the target steering reaction force, not on the basis of the steering angle. For example, the setting device sets the target steering reaction force to be zero if the steering torque is zero. Thus, when the vehicle speed is less than or equal to the reference vehicle speed, such as, for example, when the vehicle stops, it is possible to certainly inhibit or prevent the driver from feeling the unnecessary steering reaction force.

In other aspect of the first vehicle steering apparatus of the present invention, the reference vehicle speed is a vehicle speed that can be regarded as a stop of the vehicle.

According to this aspect, when the vehicle speed is less than or equal to the vehicle speed that can be regarded as the stop of the vehicle, it is possible to certainly inhibit or prevent the driver from feeling the unnecessary steering reaction force. Here, the "vehicle speed that can be regarded as the stop of the vehicle" includes in effect not only a vehicle speed when the vehicle completely stops (i.e. 0 km per hour) but also a vehicle speed obtained in cases where the vehicle almost stops, such as, for example, 2 km per hour or less.

In order to solve the above-mentioned object, second vehicle steering apparatus which is mounted on a vehicle, and which sets a target steering reaction force to be applied to a steering wheel on the basis of a steering angle and a vehicle speed, and performs reaction force control to apply the target steering reaction force. The second vehicle steering apparatus is provided with a setting device for setting the target steering reaction force based on the steering angle and the vehicle speed, to be smaller in a region in which the vehicle speed is low, than that obtained in a region in which the vehicle speed is high.

According to the second vehicle steering apparatus of the present invention, the target steering reaction force is set on the basis of the steering angle and the vehicle speed, and the target steering reaction force is applied to the steering wheel by the reaction force control.

In the present invention, in particular, the setting device sets the target steering reaction force based on the steering angle and the vehicle speed, to be smaller in the region in which the vehicle speed is low, than that obtained in the region in which the vehicle speed is high. For example, if the vehicle speed is less than or equal to the predetermined reference vehicle speed, the setting device sets the target steering reaction force based on the steering angle and the vehicle speed, to be less than that obtained in a case the vehicle speed is greater than the reference vehicle speed. Thus, when the vehicle speed is in the low region, such as, for example, when the vehicle stops, it is possible to inhibit or prevent the driver from feeling the unnecessary steering reaction force and to improve the steering feeling of the driver.

The operation and other advantages of the present invention will become more apparent from Mode for Carrying Out the Invention explained below.

MODE FOR CARRYING OUT THE INVENTION

Hereinafter, an embodiment of the present invention will be explained with reference to the drawings.
<First Embodiment>

A vehicle steering apparatus in a first embodiment will be explained with reference to FIG. 1 to FIG. 3.

Firstly, an entire configuration of a vehicle provided with the vehicle steering apparatus in the embodiment will be explained with reference to FIG. 1.

Figure 1:
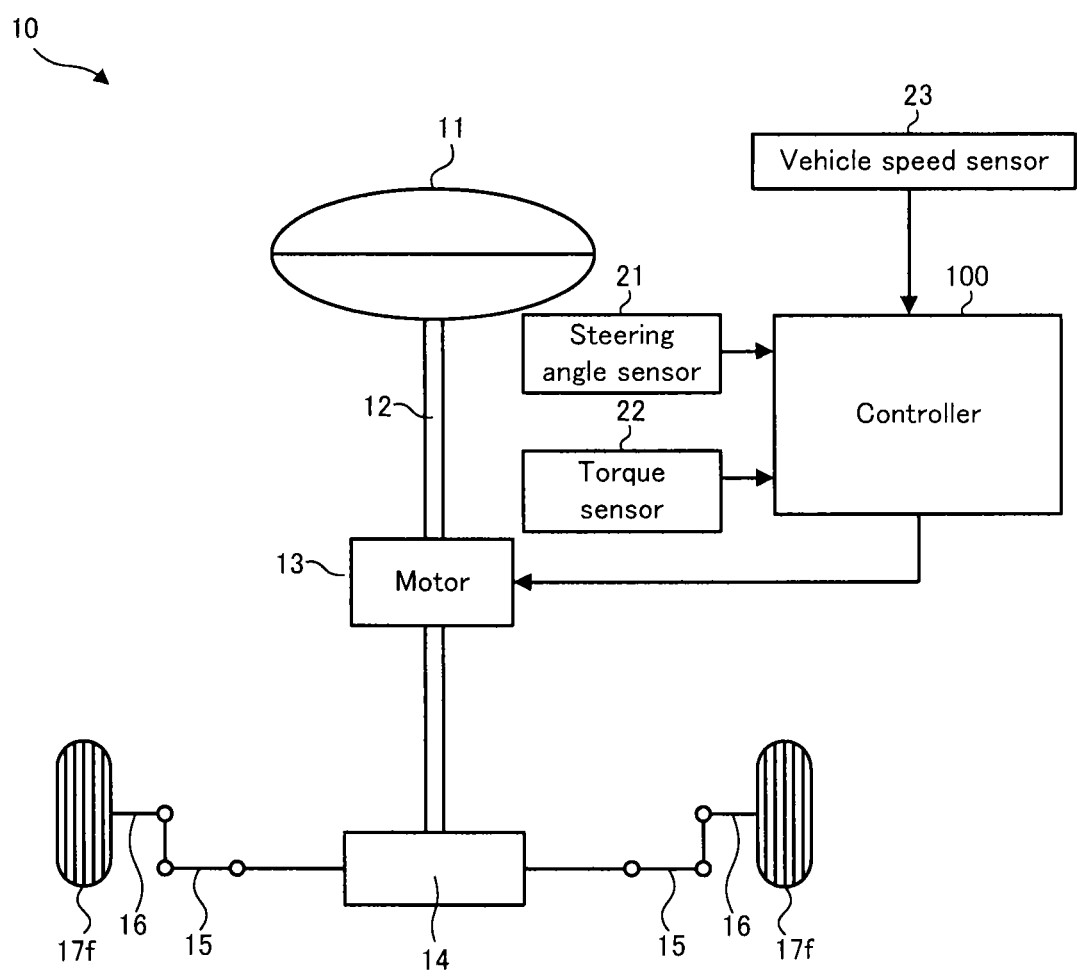
FIG. 1 is a block diagram illustrating an entire configuration of a vehicle provided with a vehicle steering apparatus in a first embodiment.

FIG. 1 is a block diagram illustrating the entire configuration of the vehicle provided with the vehicle steering apparatus in the embodiment.

In FIG. 1, a vehicle 10 provided with the vehicle steering apparatus in the embodiment is provided with a steering wheel 11, a steering shaft 12, a motor 13, a rack and pinion unit 14, tie rods 15, knuckle arms 16, front wheels 17$f$, a steering angle sensor 21, a torque sensor 22, a vehicle speed sensor 23, and a controller 100.

The steering wheel 11 (hereinafter simply referred to as a "steering 11", as occasion demands) is one example of the "steering wheel" of the present invention, and is operated by a driver to turn the vehicle 10 or to perform similar actions. The steering 11 is connected to the rack and pinion unit 14 via the steering shaft 12 which is one example of the "steering shaft" of the present invention. The steering shaft 12 has the steering angle sensor 21, the torque sensor 22, and the motor 13 disposed thereon.

The steering angle sensor 21 detects a steering angle corresponding to the operation of the steering 11 by the driver. The steering angle sensor 21 provides the controller 100 with a detection signal corresponding to the detected steering angle.

The torque sensor 22 detects steering torque applied to the steering shaft 12 via the steering 11. The torque sensor 22 provides the controller 100 with a detection signal corresponding to the detected steering torque.

The vehicle speed sensor 23 detects a vehicle speed of the vehicle 10, and provides the controller 100 with a detection signal corresponding to the detected vehicle speed.

The motor 13 is provided with a reduction gear, an electric motor and the like, and applies torque to the steering shaft 12 under control by the controller 100. Hereinafter, the torque applied by the motor 13 to the steering shaft 12 will be referred to as "assist torque", as occasion demands.

The rack and pinion unit 14 is provided with a rack and a pinion, and operates by rotation transferred from the steering shaft 12. To the rack and pinion unit 14, the tie rods 15 and the knuckle arms 16 are connected. To the knuckle arms 16, the front wheels 17$f$ are connected. In this case, the tie rods 15 and the knuckle arms 16 are operated by the rack and pinion unit 14, by which the front wheels 17$f$ connected to the knuckle arms 16 are steered.

The controller 100 is an electronic control unit provided with a central processing unit (CPU), a read only memory (ROM), a random access memory (RAM) and the like. The controller 100 has a function as one example of the "setting device" of the present invention, and sets a target steering reaction force on the basis of the respective detection signals supplied from the steering angle sensor 21, the torque sensor 22, and the vehicle speed sensor 23. The controller 100 performs reaction force control for controlling the motor 13 so as to apply the set target steering reaction force to the motor 13. In other words, in the reaction force control, the assist torque applied by the motor 13 to the steering shaft 12 is controlled by the controller 100 so as to apply the target steering reaction force to the steering 11.

Next, the setting of the target steering reaction force in the vehicle steering apparatus in the embodiment will be explained with reference to FIG. 2 and FIG. 3.

Figure 2:
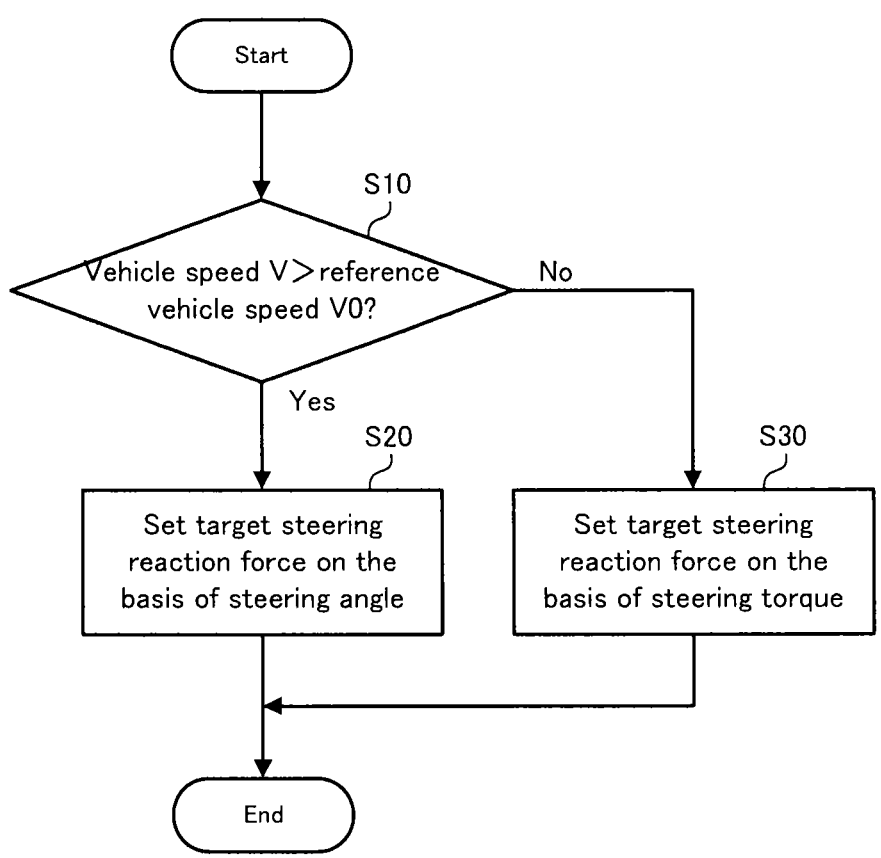
FIG. 2 is a flowchart illustrating a flow of setting a target steering reaction force in the vehicle steering apparatus in the first embodiment.

FIG. 2 is a flowchart illustrating a flow of setting the target steering reaction force in the vehicle steering apparatus in the embodiment.

In FIG. 2, in the setting of the target steering reaction force in the embodiment, firstly, it is judged by the controller 100 whether or not a vehicle speed V is greater than a predetermined reference vehicle speed V0 (step S10). Here, as the reference vehicle speed V0, a vehicle speed obtained in cases where the vehicle almost stops, such as, for example, 1 km to 2 km per hour, is set.

If it is judged that the vehicle speed V is greater than the reference vehicle speed V0 (the step S10: Yes), the target steering reaction force is set on the basis of the steering angle (step S20). In other words, in this case, the controller 100 sets the target steering reaction force on the basis of the detection signal supplied from the steering angle sensor 21. More specifically, the controller 100 sets a target steering reaction force S to be applied to the steering 11, on the basis of a target steering reaction force map as illustrated by a graph in FIG. 3. The target steering reaction force map is a map for defining the target steering reaction force S in accordance with a steering angle MA and the vehicle speed V. Incidentally, FIG. 3 illustrates only a relation between the steering angle MA and the target steering reaction force S in the target steering reaction force map and omits the illustration of a relation between the vehicle speed V and the target steering reaction force S. The target steering reaction force map is stored in the ROM or RAM of the controller 100.

On the other hand, if it is judged that the vehicle speed V is not greater than the reference vehicle speed V0 (i.e the vehicle V is less than or equal to the reference vehicle speed V0) (the step S10: No), the target steering reaction force is set on the basis of the steering torque (step S30). In other words, in this case, the controller 100 sets the target steering reaction force on the basis of the detection signal supplied from the torque sensor 22. At this time, the controller 100 sets the target steering reaction force, not on the basis of the target steering reaction force map described above with reference to FIG. 3, i.e. not on the basis of the steering angle. More specifically, the controller 100 sets the target steering reaction force on the basis of the steering torque so as to balance torque caused by the target steering reaction force with the steering torque. Thus, for example, if the steering torque is zero, the target steering reaction force is set zero. In other words, in the embodiment, the controller 100 sets the target steering reaction force such that the target steering reaction force is less than a steering reaction force according to expected maximum steering torque. Incidentally, the expected maximum steering torque is one example of the "base steering reaction force" of the present invention.

Figure 3:
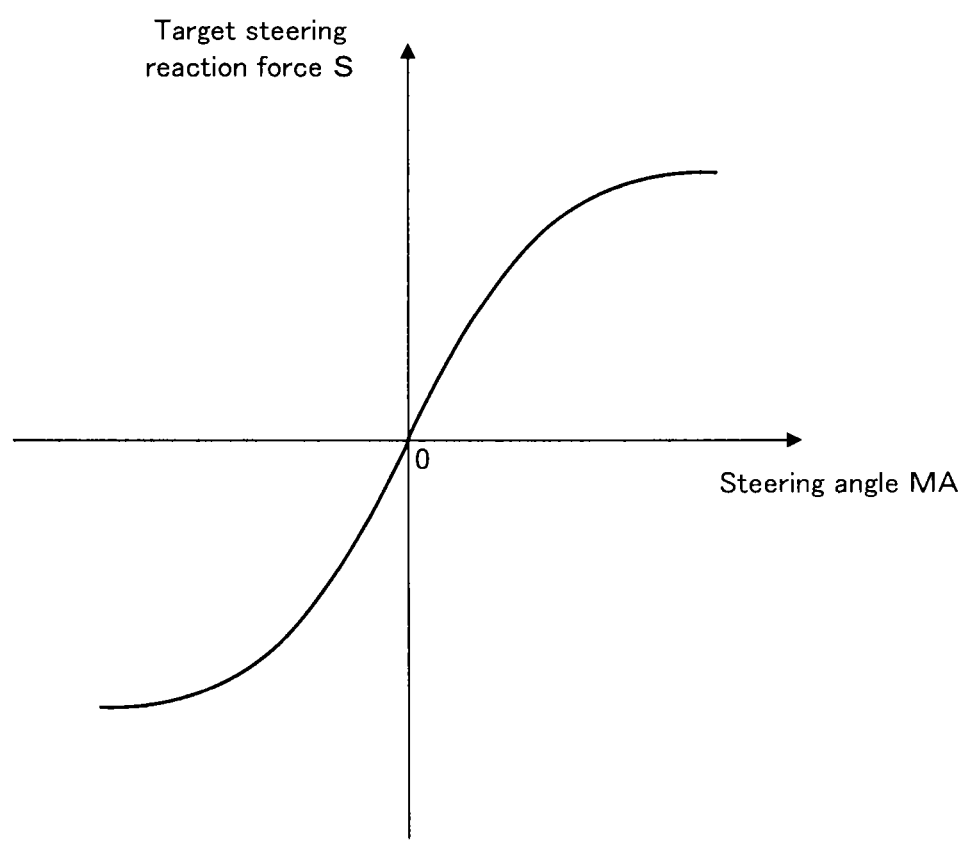
FIG. 3 is a map for defining the target steering reaction force if a vehicle speed is greater than a reference vehicle speed.

Here, even in cases where no measures are taken and the vehicle speed V is less than or equal to the reference vehicle speed V0, if the target steering reaction force is set on the basis of the steering angle as in cases where the vehicle speed V is greater than the reference vehicle speed V0, the target steering reaction force is not zero unless the steering angle is zero (refer to FIG. 3). Thus, for example, in a situation in which the driver turns the steering 11 to the right or left when the vehicle 10 stops, the driver likely feels an unnecessary steering reaction force.

In the embodiment, however, particularly if the vehicle speed V is less than or equal to the reference vehicle speed V0, the controller 100 sets the target steering reaction force on the basis of the steering torque so as to balance the torque caused by the target steering reaction force with the steering torque. This inhibits or prevents the drier from feeling the unnecessary steering reaction force when the vehicle V is less than or equal to the reference vehicle speed V0, such as when the vehicle stops, thereby improving the steering feeling of the driver. In other words, in the situation in which the driver turns the steering 11 to the right or left when the vehicle 10 stops, the driver only feels a steering reaction force corresponding to the steering torque but hardly feels or does not feel the unnecessary steering reaction force. Moreover, for example, if the steering torque becomes zero by letting go of the steering 11 after the driver turns the steering 11 to the right or left when the vehicle 10 stops, the target steering torque becomes zero, and the steering 11 can be continuously turned to the right or left. This can improve the operability of the steering 11 by the driver.

As explained above, according to the vehicle steering apparatus in the embodiment, the target steering reaction force is set on the basis of the steering angle if the vehicle speed V is greater than the reference vehicle speed V0, and the target steering reaction force is set on the basis of the steering torque if the vehicle speed V is less than or equal to the reference vehicle speed V0. This can improve the steering feeling of the driver.

Here, particularly when the vehicle speed is less than or equal to the reference vehicle speed V0, such as when the vehicle stops, it is possible to inhibit or prevent the driver from feeling the unnecessary steering reaction force and to improve the operability of the steering 11 by the driver.

Incidentally, the embodiment exemplifies that if it is judged that the vehicle speed is less than or equal to the reference vehicle speed V0 (the step S10: No), the target steering reaction force is set by the controller 100 on the basis of the steering torque (the step S30); however, if it is judged that the vehicle speed V is less than or equal to the reference vehicle speed V0, the target steering reaction force may be set by the controller 100 on the basis of the steering angle MA and the vehicle speed V such that the target steering reaction force is less than that obtained when the vehicle speed V is greater than the reference vehicle speed V0. In other words, in a region in which the vehicle speed is less than the reference vehicle speed V0, the target steering reaction force based on the steering angle MA and the vehicle speed V may be set smaller, in comparison with a region in which the vehicle speed is greater than the reference vehicle speed V0. Even if the target steering reaction force is set in this manner, when the vehicle speed V is less than or equal to the reference vehicle speed V0, such as, for example, when the vehicle stops, it is possible to inhibit or prevent the driver from feeling the unnecessary steering reaction force and to improve the steering feeling of the driver.

The present invention is not limited to the aforementioned embodiment, but various changes may be made, if desired, without departing from the essence or spirit of the invention which can be read from the claims and the entire specification. A vehicle steering apparatus, which involves such changes, is also intended to be within the technical scope of the present invention.

Description of Reference Codes 11 steering wheel
12 steering shaft
13 motor
17 front wheel
21 steering angle sensor
22 torque sensor
23 vehicle speed sensor
100 controller

The invention claimed is:

1. A vehicle steering apparatus, mounted on a vehicle, for setting a target steering reaction force to be applied to a steering wheel and for performing reaction force control to apply the target steering reaction force, said vehicle steering apparatus comprising:
a setting device for setting the target steering reaction force on the basis of a steering angle if a vehicle speed is greater than a reference vehicle speed that can be regarded as a stop of the vehicle and for setting the target steering reaction force such that the target steering reaction force is less than a predetermined base steering reaction, on the basis of steering torque applied to a steering shaft via the steering wheel force if the vehicle speed is less than or equal to the reference vehicle speed.

2. The vehicle steering apparatus according to claim 1, wherein said setting device sets the target steering reaction force, not on the basis of the steering angle but on the basis of the steering torque, when the vehicle speed is less than or equal to the reference vehicle speed.

3. The vehicle steering apparatus according to claim 1, wherein said setting device sets the target steering reaction force on the basis of the steering torque so as to balance the steering torque with torque caused by the target steering reaction force when the vehicle speed is less than or equal to the reference vehicle speed.

4. A vehicle steering apparatus, mounted on a vehicle, for performing reaction force control to apply a target steering reaction force to a steering wheel, said vehicle steering apparatus comprising:
a setting device for setting the target steering reaction force based on a steering angle and a vehicle speed of the vehicle, to be smaller in a region in which the vehicle speed is low, than that obtained in a region in which the vehicle speed is high,
said setting device setting the target steering reaction force on the basis of the steering angle when the vehicle speed is greater than a reference vehicle speed, said setting device setting the target steering reaction force on the basis of steering torque applied to a steering shaft via the steering wheel when the vehicle speed is less than or equal to the reference vehicle speed.

5. The vehicle steering apparatus according to claim 4, wherein said setting device sets the target steering reaction force, not on the basis of the steering angle but on the basis of the steering torque, when the vehicle speed is less than or equal to the reference vehicle speed.

* * * * *